Sept. 24, 1957     A. L. NELSON     2,807,498
AUTOMOBILE DOOR STRUCTURE
Filed Nov. 7, 1955                                            2 Sheets-Sheet 1

INVENTOR.
AUGUST L. NELSON
BY Whittemore, Hulbert
Belknap
ATTORNEYS

Sept. 24, 1957     A. L. NELSON     2,807,498
AUTOMOBILE DOOR STRUCTURE
Filed Nov. 7, 1955          2 Sheets-Sheet 2
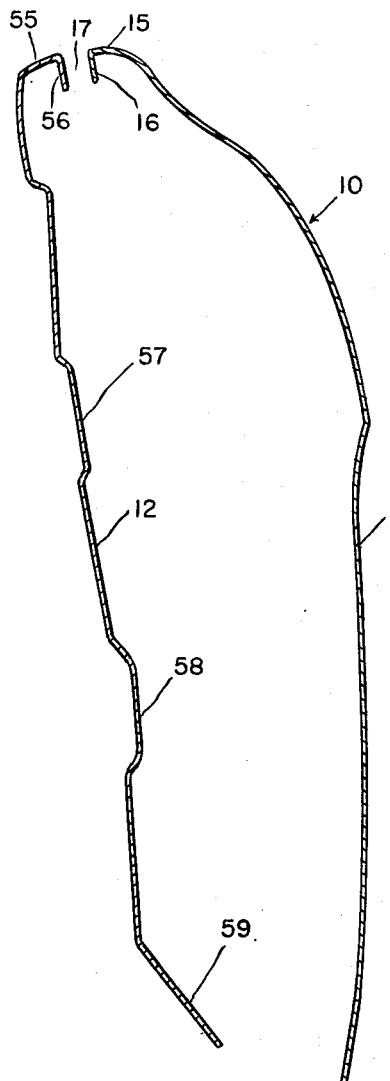
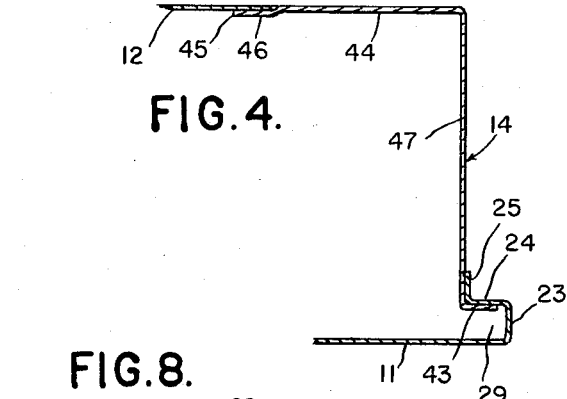
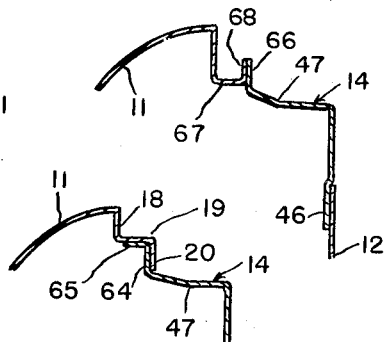
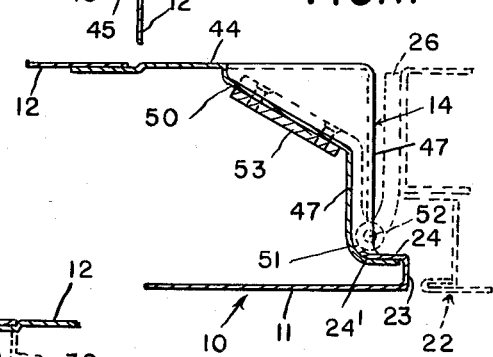
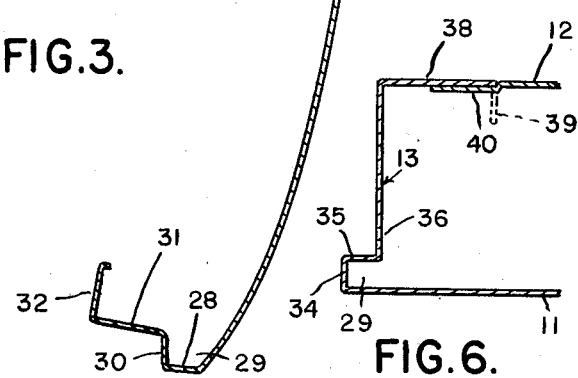
*INVENTOR.*
AUGUST L. NELSON
BY *Whittemore, Hulbert & Belknap*
ATTORNEYS United States Patent Office 2,807,498
Patented Sept. 24, 1957

2,807,498
AUTOMOBILE DOOR STRUCTURE

August L. Nelson, Grand Rapids, Mich., assignor to United Industrial Corporation, a corporation of Michigan Application November 7, 1955, Serial No. 545,459

6 Claims. (Cl. 296—44)

The present invention relates generally to improvements in a door structure, for example a sheet metal automotive door of the type employed in convertible automobiles, runabouts, roadsters and the like. The improved door incorporates its structural features, to a much greater degree than has heretofore been deemed possible, in a single panel-like unit. These features include the external outer finish panel of the door, its upright, locking end pillar and its bottom cross sill.

It is an object of the invention to provide a unitary door member of this type, composite as to function, which is readily fabricated and assembled with other door parts, such as a further upright hinging end pillar and an inner door member which may be panel-like in character. In the interest of simplicity, this inner member will be referred to as an inner panel, special note being taken that the outer member or finish panel supplies the additional integral parts to complete a door body structure.

More specifically, and in accordance with the example herein illustrated, it is an object of the invention to provide a unitary door body made up in the main of a single sheet member formed to provide an outer door panel of curved cross sectional contour, substantially co-extensive in area with the door body as a whole, an integral end pillar at one end of this panel and an integral sill across its bottom, with which member an inner door member or structure of suitable type is associated to support the usual operating mechanisms, as for a door latch, a vertically sliding window panel, and the like. In accordance with the invention the outer panel is shaped to afford a laterally outwardly flanged stop at the end and bottom sill portions thereof, which is continuous and of boxed or inwardly opening channel cross section, considerably rigidifying the panel structure around its margin. Further, the integral end pillar and sill portions referred to extend transversely inwardly from the stop flange the entire width of the door structure, as well as longitudinally from top to bottom and end to end thereof, respectively. An integral, one-piece panel unit of this character, when appropriately secured, as by welding, to overlapped surfaces of the inner door panel and a hinging end pillar, provides a door of great simplicity, strength and rigidity, and one which is very economical of manufacture.

A further and more specific object of the invention is to provide a door structure constituted in the above described manner, in which the bottom sill portion of the outer door panel is upwardly flanged, and thus stiffened, along its inner margin, being rigidly secured to the inner door panel by means of vertically extending straps secured and extending between the upturned sill flange and the inner door panel.

A still further specific object is to provide a door structure constituted by an outer door panel of the above description which affords a continuous flange portion about its opposed ends and bottom, having the effect of substantially rigidifying the structure as a whole, while still affording a door stop means for the structure and a full width bottom sill of the same, and in which the outer panel is also provided with an inwardly directed, downturned upper lip or flange across the length of its top. This flange co-acts with a generally similar flange on the inner door panel of the structure in defining a downwardly opening slot to a window panel receiving well in the interior of the door structure.

The foregoing as well as other objects will be made more apparent as this description proceeds, especially when considered in connection with the accompanying drawings, wherein:

Fig. 1 is a front perspective view of the improved door structure;

Fig. 2 is a perspective view of the interior of the structure, both Figs. 1 and 2 of course showing the structure as stripped of operating and finish provisions subsequently associated therewith;

Fig. 3 is a view in enlarged scale in vertical section along line 3—3 of Fig. 2;

Figs. 4, 5 and 6 are, respectively, fragmentary views in transverse horizontal section along lines 4—4, 5—5 and 6—6, of Fig. 1;

Fig. 7 is a fragmentary view in horizontal section along line 7—7 of Fig. 1, additionally showing in dotted line provisions for hinging the door structure to an automotive frame; and Fig. 8 is a fragmentary view in section similar to Fig. 5 showing an alternate suggested arrangement and assembly of component door parts adjacent the front and top of the structure.

Referring first to Figs. 1 and 2, the improved door structure 10 of the invention consists of three simple basic components. These are an outer door member or panel 11 of sheet metal or other appropriate material embodying the essence of the door (since end pillar and sill parts are derived therefrom), which panel is of more or less complex curvilinear cross sectional contour (see Fig. 3), as dictated by the present trend in automotive body design; an inner rigid door member 12, which may be in the form of a sheet metal panel 12 of relatively small size and is generally flat; and a forward, hinging end pillar member 14 which is interfitted with and secured between the inner and outer door members or panels 11, 12. As stated, the outer panel 11 provides the locking end pillar or panel 13 at the opposite, rear end of the door 10, as well as bottom sill and stop means to be described.

Fig. 3 of the drawings shows the general sectional contour of the door structure 10. Its outer panel 11 is shaped in conformity with the sectional outline of the outer body panelling of the automobile adjoining the same. Panel 11 is bent inwardly at 15 across the portion of its top which is to receive a sliding window panel (not shown) and is bent downwardly to form a flange 16 across this length of the panel. This defines one margin of a top slot 17 opening downwardly to a window well in the interior of door structure 10. Along the top panel 11, from the forward end of the latter to the slot 17, the panel is flanged vertically downwardly at 18, shown in Fig. 5, and this flange is bent 90° at 19, then flanged 90° downwardly at 20 to provide a lip which co-acts with web 19 to afford a longitudinal welding zone.

Other details relating to the cross sectional configuration of outer door panel 11 are illustrated in Figs. 4, 6 and 7, of which Figs. 4 and 7 show the formation of panel 11 adjacent the forward, hinging end pillar member 14, while Fig. 6 depicts the structure at the opposite integral pillar 13. Pillar member 14 is pivoted to the automotive body, generally designated in Fig. 7 by the reference numeral 22. Referring to Fig. 4, it is seen that the panel 11 is bent inwardly at 23 along its end margin to provide an inwardly extending stop flange of substantial width in the direction from outside-to-inside of the door structure. Flange 23 is return bent 90° at 24 toward the interior of structure 10, and is then further flanged 90° inwardly at 25 to afford an attaching zone along the end pillar 14 which corresponds functionallly to the zone afforded by the web 19 and flange 20 of Fig. 5. Special provisions are made in the hinge end pillar 14 of the structure to receive conventional door hinges 26. These provisions will be described in greater detail upon completion of the description of the structural nature of outer door panel, per se.

As illustrated best in Fig. 3, the panel 11 is provided with an inwardly extending flange 28 across the length of its bottom which is in alignment in the direction of said length with the inwardly extending flange 23 at the end of the structure. Flange 28 thus represents a bottom continuation of stop flange 23 and is bent upwardly at 30 to define, with flange 23 and member 24, an interior box-like channel 29 around the hinge pillar end and bottom of the structure.

The upwardly extending portion 30 is brought outwardly in a generally horizontal plane at 31 to provide a continuous bottom sill flange or web across the entire width and end-to-end length of outer door panel 11, from channel 29 to the inner side of the door. This sill is in turn flanged 90° upwardly at 32 to rigidify panel 11 and the structure 10 as a whole, as well as to provide an inner welding or attaching zone across the length of the structure.

With reference to Fig. 6, considered with Fig. 2, it is seen that the sectional contour of outer door panel 11 at its channel 29 adjacent the end pillar 13 generally resembles the arrangement at the hinge end. That is, the panel 11 is flanged 90° inwardly at 34 and is then bent 90° at 35 to define an upward end extension of the channel 29; and a further inward 90° bending at 36 across the remaining width of door 10 provides the pillar 13 proper. It is to be understood that the inwardly opening channel 29 is exactly conformed at the ends of structure 10 with the curvature of the outer surface of panel 11, for exact alignment with an adjacent surface of the door frame 22.

The pillar member 13 is flanged 90° inwardly at 38 along its margin, at which zone it is seamed, as by welding, to the adjacent edge of inner door panel 12, which is offset slightly at 40 to receive flange 38 in a substantially flush relation. This welded connection extends the height of the inner panel edge zone 40; beneath inner panel 12 the flange 38 is offset 90° at 39 toward the interior of the door, as is also a corresponding flange of the opposite pillar member 14.

Referring specifically to Fig. 2, it will be noted that the upright pillar member 13 is further flanged inwardly at 41 across its bottom width, the flange 41 resting on the end of bottom sill 31 and being welded or otherwise rigidly secured to the sill at this point. The end pillar member 14 at the opposite end of the structure 10 has a bottom flange corresponding to the flange 41, which is similarly secured rigidly to the sill 31.

For the rest, the structural features of pillar 14 may be ascertained from an inspection of Figs. 2, 4 and 7. Its outer extremity is provided with an outturned 90° flange 43 which is internally nested against the flange elements 24, 25 of outer panel 11 and welded or otherwise rigidly secured along this vertical zone. Pillar member 14 is provided with a 90° inturned flange 44 at its inner margin and, as illustrated in Fig. 2, the flange 44 has a curvilinear inner margin at 45. It is offset slightly laterally along this margin at 46 (Fig. 4), thus receiving the adjacent, correspondingly shaped margin of inner door panel 12 in a flush relation to the exposed surface of panel 44. The transverse portion of pillar 14, parts of which are specially designated 47 in Figs. 2 and 4, extends upwardly at 48 and is then bent inwardly, terminating at its inner extremity in a lip 49 which defines one end of the window slot 17 of the structure.

As illustrated in Figs. 1, 2 and 7, the hinge end pillar 14 is provided with inward recesses 50 across vertically spaced zones of the transverse portion 47 thereof, in which leaves of appropriate hinge elements 26 are received and fixedly secured. By special reference to Fig. 7, it will be noted that the outer extremity of the panel portion 47 of pillar 14 is shaped to provide an outwardly opening curved pivot seat 51 in which the pivot 52 of hinge 26 is received. The pivot seat conforms with a correspondingly curved edge lip 24' formed on the internally flanged part 24 of the outer door panel 11; it follows that the securement of the end pillar 14 to the outer panel 11 is substantially flush and continuous along the vertical dimension of hinge pillar 14. In order to rigidify the structure at the hinge recesses 50, stiffening bolster plates 53 are preferably welded internally onto panel part 47 at the hinge recesses 50 and the screws which mount the leaf of hinge 26 are threaded into the plates.

Structural details of the inner door panel 12 are shown in Figs. 2 and 3, and as will be appreciated from the foregoing description, the outline of inner panel 12 is determined by the outline of the end pillar portions 13, 14 described above. Panel 12 is of substantially lesser vertical height than the outer panel 11. Referring to Fig. 3, it is seen that the panel 12 is bent outwardly at 55 across the window receiving portion of the length of the door structure 10. This in-bent portion or flange 55 is then angled 90° downwardly at 56, in spaced relation to the corresponding downturned flange or lip 16 of outer panel 11. Flange 56 thus completes the definition of the window slot 17 across the structure.

The inner panel 12 is provided with suitably proportioned, longitudinal extending inward embossments or like formations 57, 58 in vertical spaced relation to one another, and with any other appropriate formations which are necessary to accommodate the usual door latching and locking mechanism, the window operating structure, etc. (all not shown). The invention does not deal with these details. Panel 12 is angled inwardly at 59 along the length of its lower margin.

The outer and inner door panels 11, 12 are rigidly coupled together to brace the same, and the structure 10 as a whole, by means of a pair of upright straps 60 of relatively heavy, rigid stock. These are offset at their top and bottom extremities, as indicated at 61, so as to seat against the upper edge of the upturned flange 32 of panel 11 and against the lower edge of panel 12, the latter being appropriately notched or recessed at 62 to receive the strap 60 in such relation.

Fig. 5 represents a practical sectioning of the outer panel 11 and pillar member 14 across the top thereof and at one end of the window slot 17. It is seen that the panel portion 47 is of substantially lesser width in this zone than in the vertically extending portion of the pillar. The latter is provided with successive 90° flanges 64, 65 which nest internally of corresponding flange elements 19, 20. As an alternative construction, shown in Fig. 8, the panel portion 47 may be given a single outward bend at 66, and the outer panel 11 may be provided with an inward flange 67 and upturned lip 68, against which the flange may seat flush and secured to complete the assembly of the parts.

The invention affords a door structure of great simplicity and rigidity in which the outer door panel 11 serves as the major component, providing desired rigidifying stop means at its perimeter and end pillar and bottom sill parts. Eliminating as it does the use of separate members for these parts, the structure lends itself to fast, easy and economical assembly, and is an exceedingly strong one indeed.

What I claim as my invention is:

1. A door structure comprising an outer panel substantially co-extensive in area with the structure and having at its bottom an integral inturned, substantially horizontal sill constituting portion extending substantially the entire end-to-end length of the structure and of substantially the entire width of the structure in the direction inwardly of said panel, said outer panel being provided at an end thereof with an integral, transversely inturned and upstanding pillar panel substantially co-extensive with said width of said structure, a further pillar panel secured to said outer panel at the opposite end thereof, and an inner door member secured at its opposite ends to said respective pillar panel, said inner door member being spaced by said pillar panels from said outer panel and coacting with the latter in defining the sides and ends of an upwardly opening window slot of said structure.

2. A door structure comprising an outer door panel formed to provide an integral inturned sill at the bottom thereof extending substantially the entire end-to-end length thereof and an integral inturned upright pillar at one end of said structure, said sill, pillar and an opposite pillar end of said panel being shaped to provide generally aligned stop portions of channel section which open inwardly from said ends and bottom and are of substantial width in the direction from said panel internally of the door structure, a pillar member disposed along said opposite pillar end of said structure and provided with an integral marginal flange which is in nested, fixedly secured engagement with the stop portion of said opposite pillar end, and an inner sheet-like door member fixedly secured along respective end margins thereof to said pillar member and to the stop portion of said first named pillar.

3. A door structure comprising an outer door panel formed to provide an integral inturned sill at the bottom thereof extending substantially the entire end-to-end length thereof and an integral inturned upright pillar at one end of said structure, said sill, pillar and an opposite pillar end of said panel being shaped to provide generally aligned stop portions of channel section which open inwardly from said ends and bottom and are of substantial width in the direction from said panel internally of the door structure, said pillar end stop portions having integral flanges extending inwardly of said panel, a pillar member disposed along said opposite pillar end of said structure and provided with an integral marginal flange which extends outwardly thereof and is in internally nested, fixedly secured engagement with the stop portion and flange of said opposite pillar end, and an inner sheet-like door member fixedly secured along respective end margins thereof to said pillar member and to the stop portion flange of said first named pillar.

4. A door structure comprising an outer door panel formed to provide an integral inturned sill at the bottom thereof extending substantially the entire end-to-end length thereof and an integral inturned upright pillar at one end of said structure, said sill, pillar and an opposite pillar end of said panel being shaped to provide generally aligned stop portions of channel section which open inwardly from said ends and bottom and are of substantial width in the direction from said panel internally of the door structure, said pillar end stop portions having integral flanges extending inwardly of said panel, a pillar member disposed along said opposite pillar end of said structure and provided with an integral marginal flange which extends outwardly thereof and is in internally nested, fixedly secured engagement with the stop portion and flange of said opposite pillar end, said pillar member having a further marginal flange extending toward said first-named end of the structure, and an inner sheet-like door member fixedly secured along respective end margins thereof to said further flange and to the stop portion flange of said first named pillar.

5. A door structure comprising an outer door panel formed to provide an integral inturned sill at the bottom thereof extending substantially the entire end-to-end length thereof and an integral inturned upright pillar at a free, swinging end of said structure, said sill, pillar and an opposite, hinging pillar end of said panel being shaped to provide generally aligned stop portions of channel section which open inwardly from said ends and bottom and are of substantial width in the direction from said panel internally of the door structure, said pillar end stop portions having integral flanges extending inwardly of said panel, a pillar member disposed along said hinging pillar end of said structure and provided with an integral marginal flange which extends outwardly thereof and is in internally nested, fixedly secured engagement with the stop portion and flange of said hinging pillar end, and an inner sheet-like door member fixedly secured along respective end margins thereof to said pillar member and to the stop portion flange of said free end pillar, said pillar member being extended at the top thereof substantially toward said free end and being secured to said inner door member and outer door panel along the length of the extension.

6. A door structure comprising an outer door panel formed to provide an integral inturned sill at the bottom thereof extending substantially the entire end-to-end length thereof and an integral inturned upright pillar at a free, swinging end of said structure, said sill, pillar and an opposite, hinging pillar end of said panel being shaped to provide generally aligned stop portions of channel section which open inwardly from said ends and bottom and are of substantial width in the direction from said panel internally of the door structure, said pillar end stop portions having integral flanges extending inwardly of said panel, a pillar member disposed along said hinging pillar end of said structure and provided with an integral marginal flange which extends outwardly thereof and is in internally nested, fixedly secured engagement with the stop portion and flange of said hinging pillar end, said pillar member having a further marginal flange extending toward said first-named, free end of the structure, and an inner sheet-like door member fixedly secured along respective end margins thereof to said further flange and to the stop portion flange of said free end pillar, said pillar member and further flange being extended at the top thereof substantially toward said free end and being secured to said inner door member and outer door panel along the length of the extension.

References Cited in the file of this patent
UNITED STATES PATENTS
2,660,470    Nelson _____ Nov. 24, 1953